(12) United States Patent (10) Patent No.: US 8,629,570 B1
Kamenov (45) Date of Patent: Jan. 14, 2014

(54) WIND TURBINE BLADES WITH REINFORCING, SUPPORTING AND STABILIZING COMPONENTS AND ENLARGED SWEPT AREA

(76) Inventor: Kamen George Kamenov, San Francisco, CA (US)

(*) Notice: Subject to any disclaimer, the term of this patent is extended or adjusted under 35 U.S.C. 154(b) by 290 days.

(21) Appl. No.: 13/200,902

(22) Filed: Oct. 3, 2011

Related U.S. Application Data

(63) Continuation-in-part of application No. 12/384,797, filed on Apr. 8, 2009, now Pat. No. 8,030,790.

(51) Int. Cl.
 *F03D 7/00* (2006.01)
(52) U.S. Cl.
 USPC ............................................... 290/44; 290/55
(58) Field of Classification Search
 USPC .................. 290/44, 55; 415/4.3, 4.5; 416/194
 See application file for complete search history.

(56) References Cited

U.S. PATENT DOCUMENTS

| | | | | |
|---|---|---|---|---|
| 440,266 | A | * | 11/1890 | Meredith .................... 416/118 |
| 1,030,900 | A | * | 7/1912 | Liston ........................ 416/135 |
| 1,532,601 | A | * | 4/1925 | Regener ..................... 416/194 |
| 2,516,576 | A | * | 7/1950 | Jacobs ........................ 416/135 |
| 3,995,972 | A | | 12/1976 | Nassar |
| 4,010,614 | A | | 3/1977 | Arthur |
| 4,031,702 | A | | 6/1977 | Burnett |
| 4,166,222 | A | | 8/1979 | Hanley |
| 4,206,608 | A | | 6/1980 | Bell |
| 4,284,899 | A | | 8/1981 | Bendiks |
| 4,443,707 | A | | 4/1984 | Scieri |
| 5,315,159 | A | * | 5/1994 | Gribnau ........................ 290/55 |
| 5,599,168 | A | * | 2/1997 | Lund ............................ 416/136 |
| 5,829,956 | A | * | 11/1998 | Chen et al. ................. 416/196 A |
| 6,023,105 | A | | 2/2000 | Youssef |
| 6,064,123 | A | * | 5/2000 | Gislason ....................... 290/55 |
| 6,748,737 | B2 | | 6/2004 | Lafferty |
| 6,884,035 | B2 | * | 4/2005 | Young ............................. 416/5 |
| 7,471,010 | B1 | | 12/2008 | Fingersh |
| 7,713,028 | B2 | * | 5/2010 | Liao ............................. 416/194 |
| 7,939,961 | B1 | * | 5/2011 | Bonnet ......................... 290/55 |

\* cited by examiner

*Primary Examiner* — Tho D Ta

(57) ABSTRACT

A rotor assembly for a horizontal-axis wind turbine with blades support attachments. Each end of the supporting elements is fixedly or rotatably attached to one blade. In a new and improved embodiment, the blades start from the support element, skipping the swept area inside these elements but at the same time increasing many times the total swept area with substantially reduced cost. The support elements might be additionally attached to already existing wind turbine rotors. The reinforcing elements support and protect the blades from bending, breaking or falling apart in strong and gusty winds. The rotor of a wind turbine occasionally will rotate with speeds higher then normal and if the blades are not reinforced and properly balanced the whole assembly may start wobbling and then break apart from the tower or the blades may be damaged or may bend or break.

4 Claims, 16 Drawing Sheets

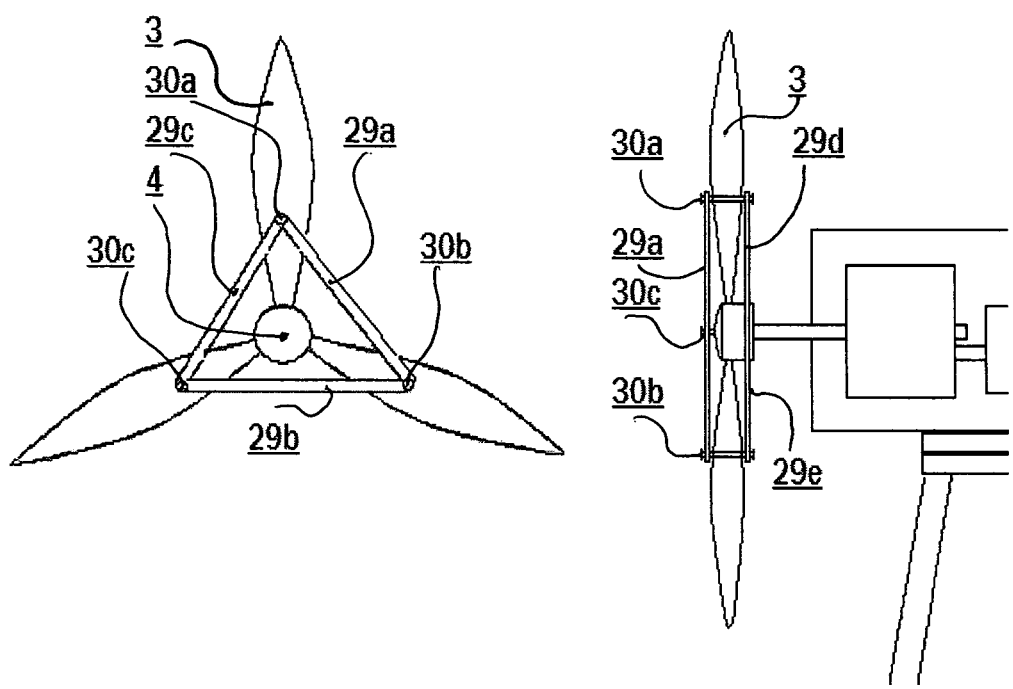

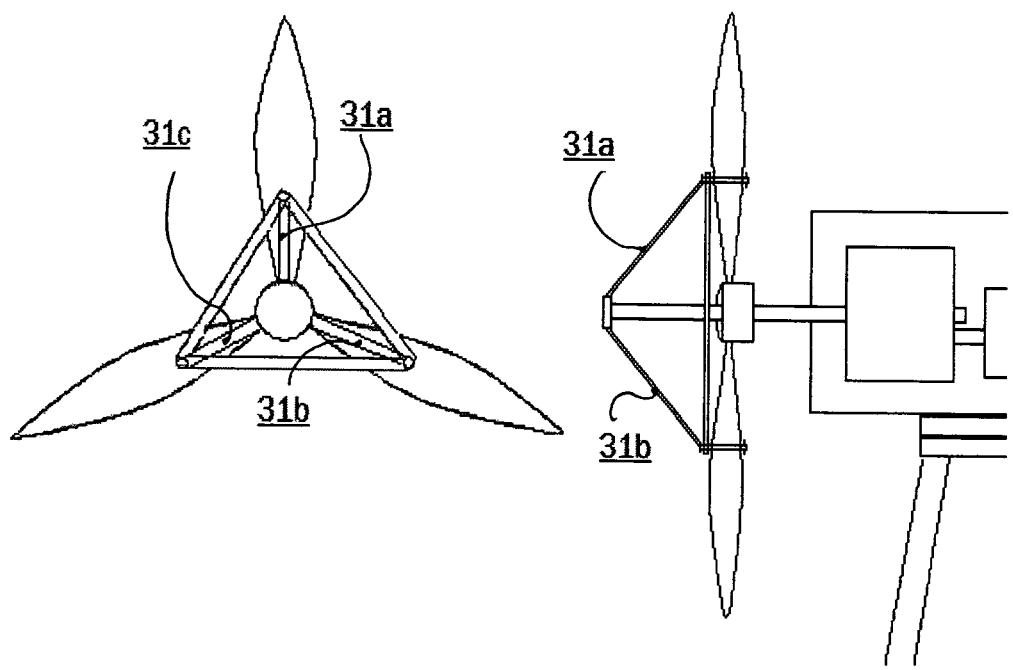

FIG. 1E
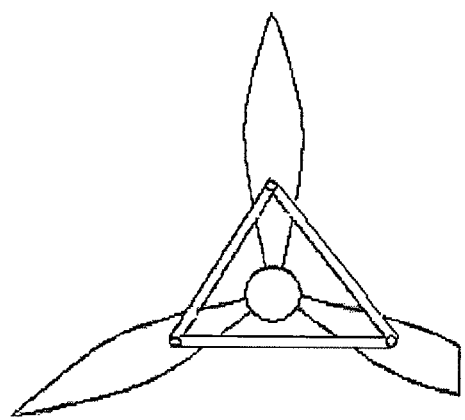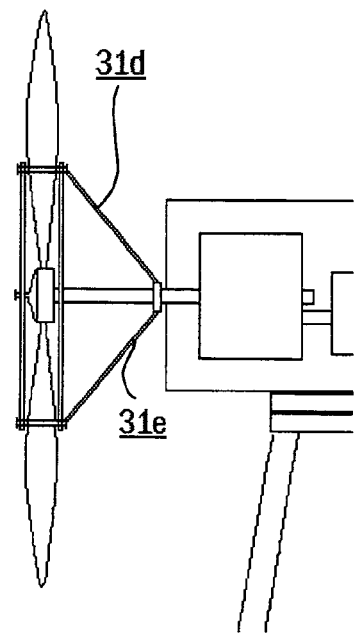

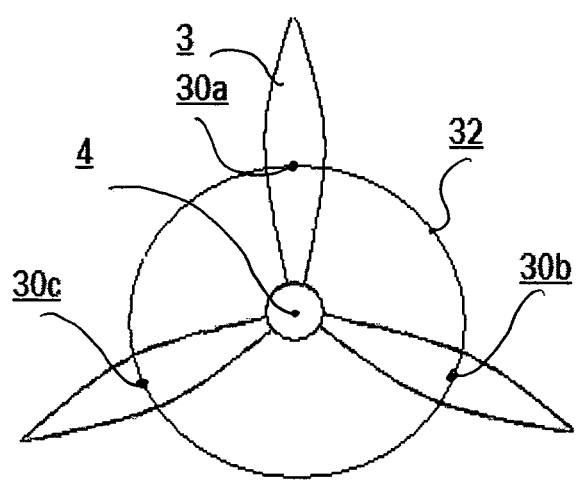

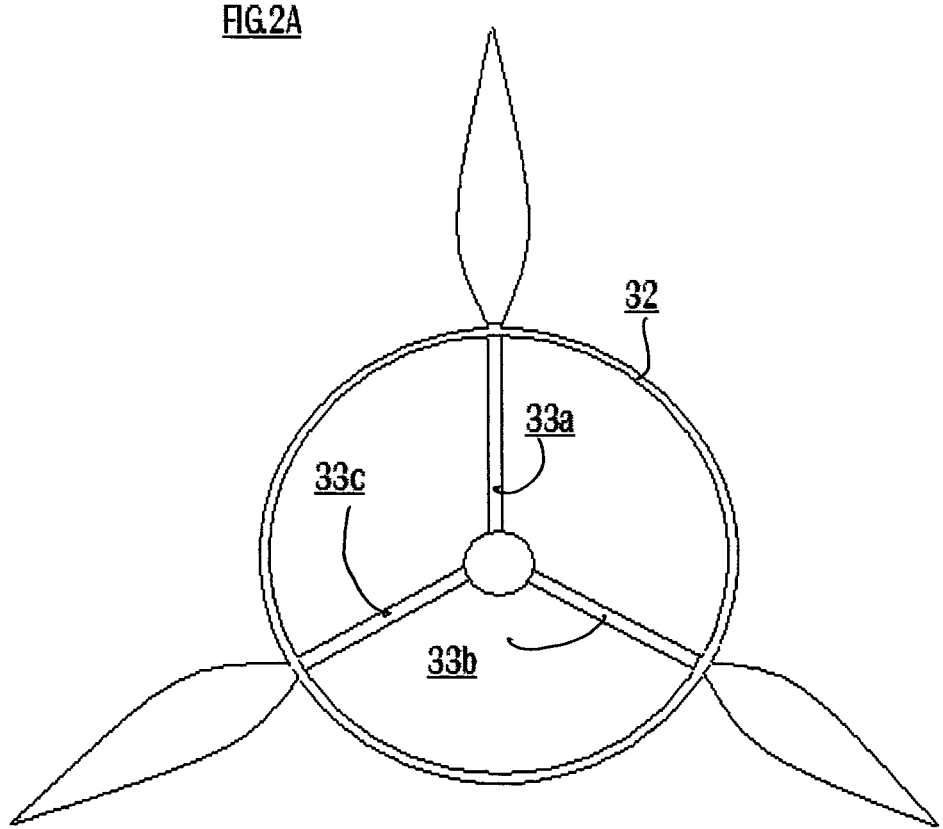

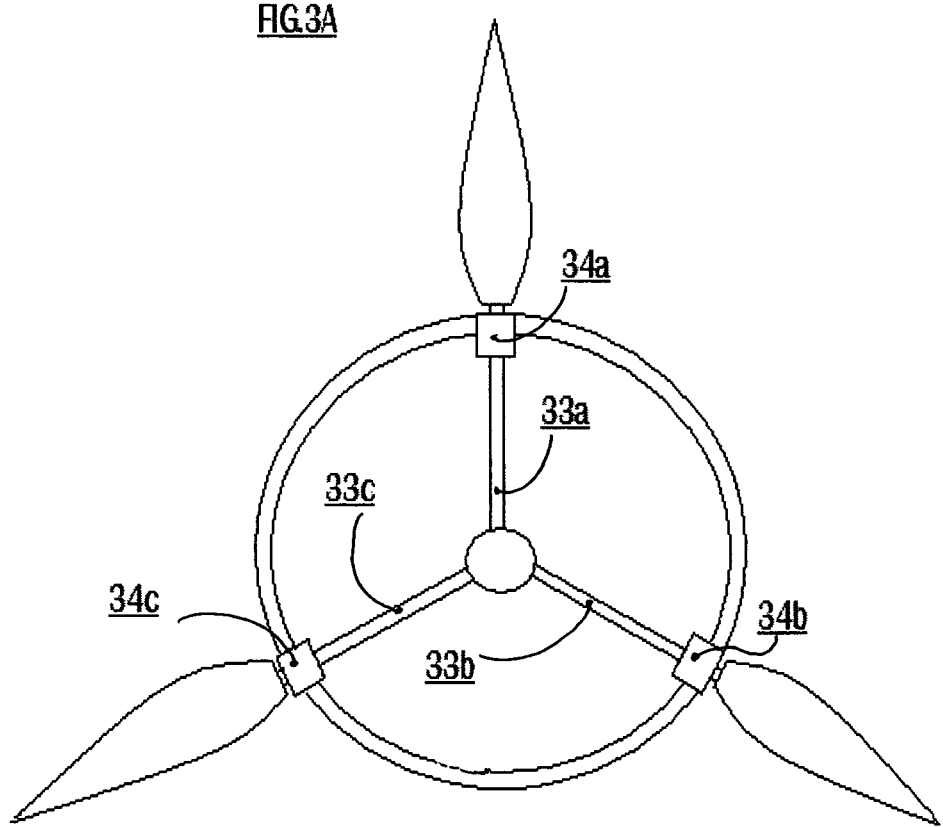

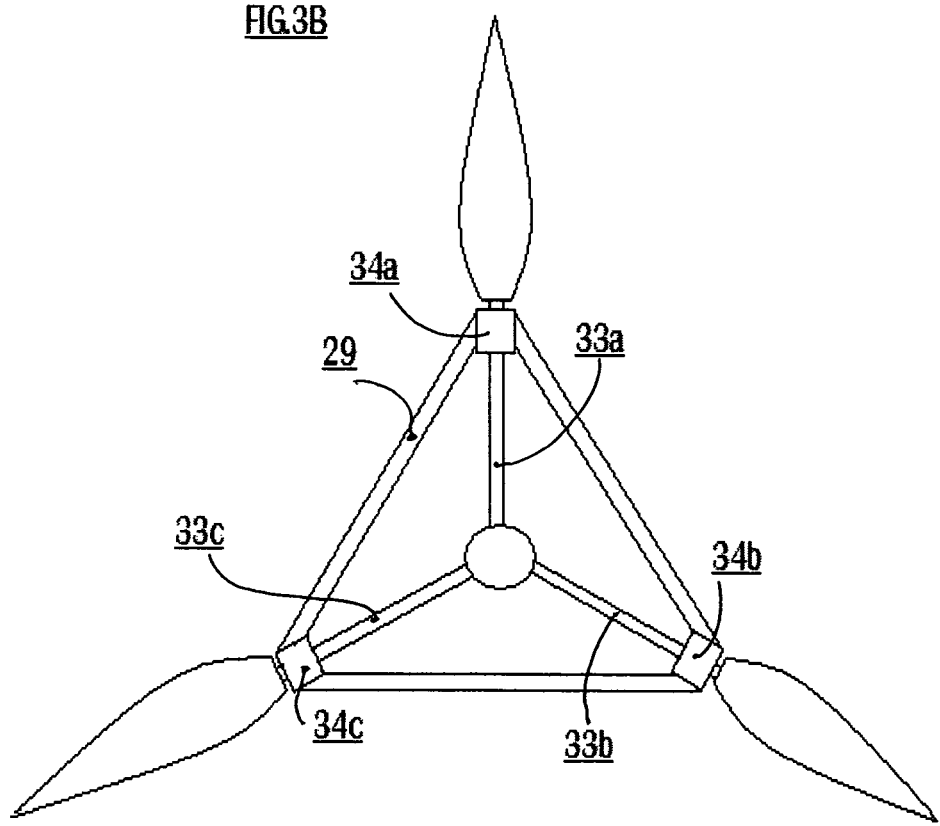

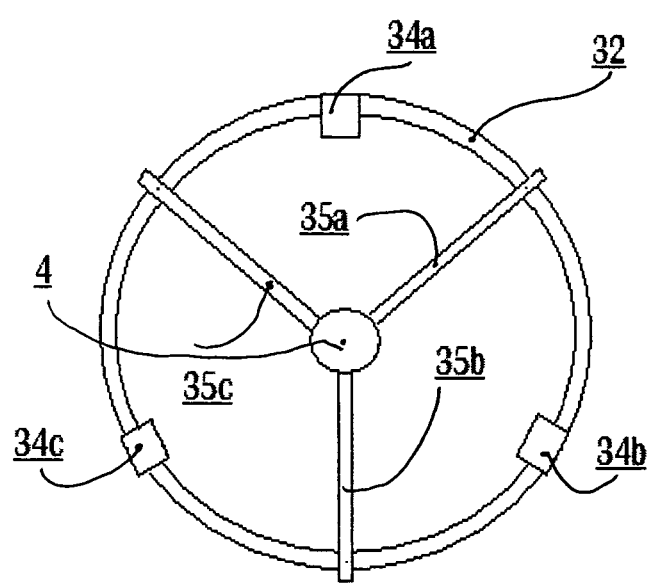

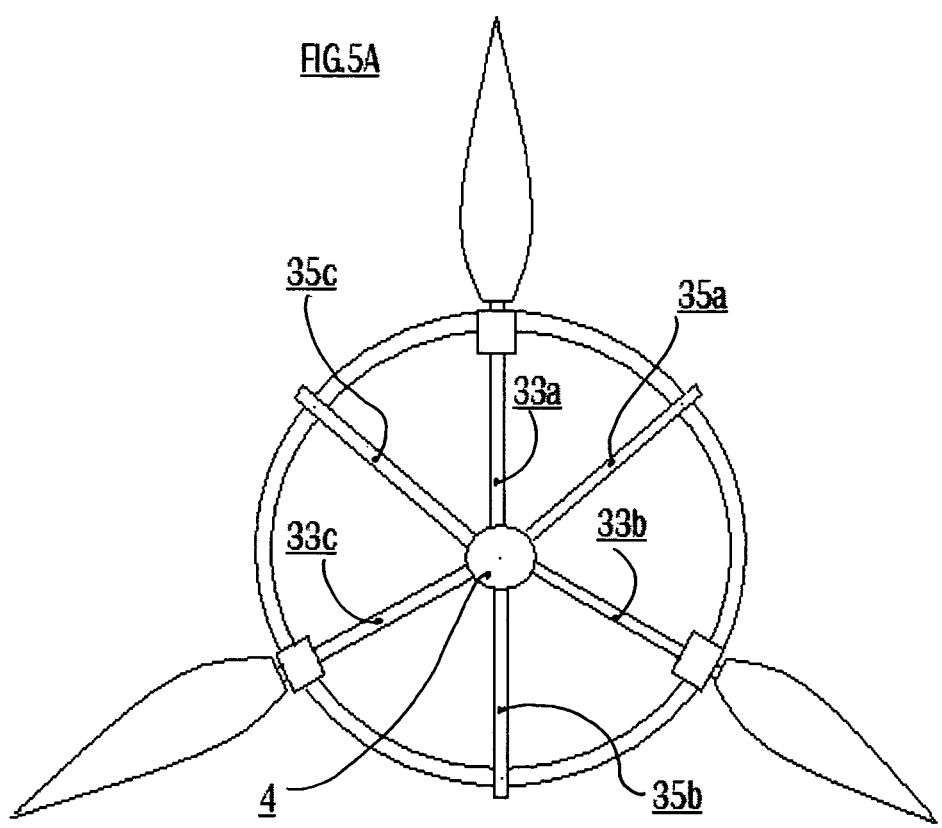

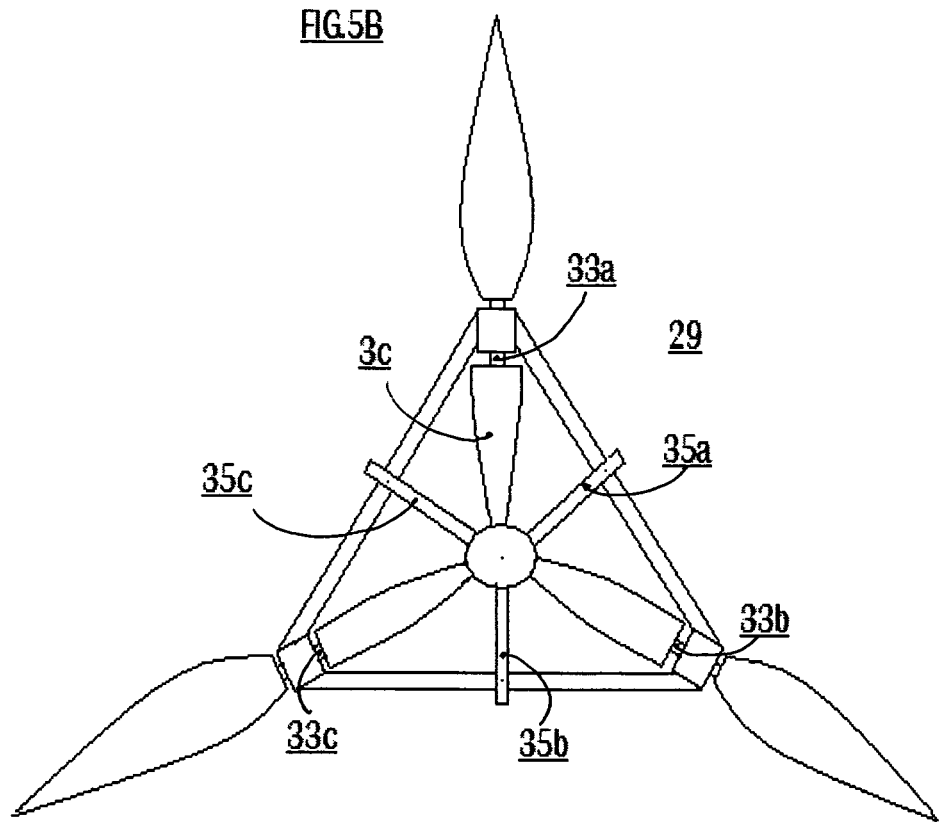

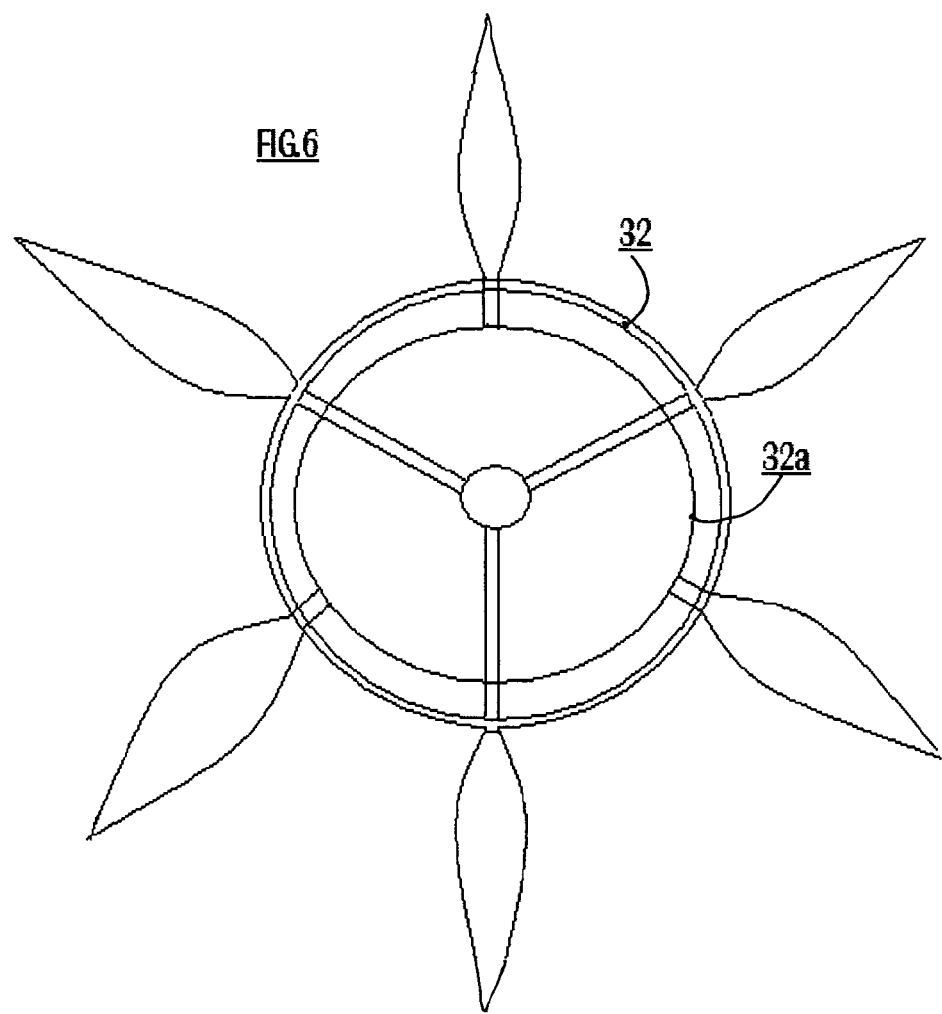

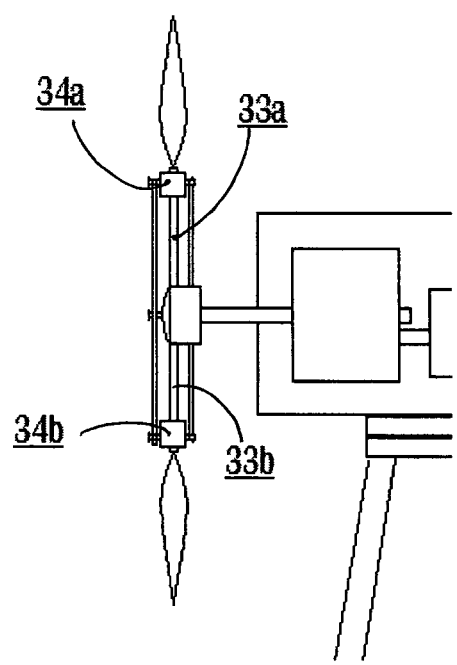

WIND TURBINE BLADES WITH REINFORCING, SUPPORTING AND STABILIZING COMPONENTS AND ENLARGED SWEPT AREA

CROSS-REFERENCE TO RELATED APPLICATIONS

This is a continuation-in-part of application Ser. No. 12/384,797, Filed on Apr. 8, 2009 now U.S. Pat. No. 8,030,790, granted on Oct. 4, 2011.

TECHNICAL FIELD

This invention relates generally to the field of alternative energy generating wind turbines used for generating electricity for transmission over the grid, and more specifically to a new rotor and blades. The above disclosure sets forth a number of embodiments of the present invention. Other arrangements or embodiments, not precisely set forth, could be practiced under the teaching of the present invention and as set forth in the following claims.

BACKGROUND OF THE INVENTION

Natural energy is available throughout the world in various forms such as wind, solar, tidal and wave energy. Wind turbines have been used for production of electricity although such use has typically been limited to the production of small amounts of direct current (DC) electricity.

Conventional sources of energy for the production of electricity are in an ever-dwindling supply, which necessitates that natural forms of energy be utilized to a greater extent. The natural forms of energy are effectively inexhaustible and are typically available in different forms throughout the world.

The first machine to generate electricity from wind was designed and built in Denmark in 1890. Subsequently, several hundred machines were built in that country.

Today wind turbines for producing electricity are widely used in some countries. In 2007 Germany was a leading power in wind energy production followed by USA:
1. Germany—22.248 MW, 2. USA—16.818 MW, 3. Spain—15.145 MW, 4. India—8.000 MW, 5. China—6.050 MW.

In 2008 the leading German firm Enercon began installation of the world's largest wind turbine Enercon E-126 with a power of 6-megawatt (MW) which is enough to supply electricity to 4,500.—homes. The diameter of the rotor of E-126 is 126 meters. The weight of the nacelle (gondola) is 75 tons. The tower is almost 200 meters tall. For comparison, the Eiffel tower is 300 meters tall.

Today most of the contemporary machines in the world are of the horizontal-axis wind turbine (HAWT) type; only less than 10% are of the vertical-axis (VAWT) type.

Wind turbines convert the kinetic energy of the wind into mechanical power through the use of a rotor that spins a shaft. The shaft is connected to a generator that converts the mechanical power into electricity.

The horizontal-axis type machines, in addition to the tower and the foundation include:
  Blades which consist of aluminum reinforced with fiberglass. They have a heavy composite cross section which now reaches 8 cm for 2 to 3 MW production machines.
  A hub which connects the blades to the low-speed shaft. The hub transmits the torque developed by the rotor blades to the shaft.
  A pitch-control assembly for tilting the blades in the hub in order to properly adjust them to the so-called "angle of attack" of the wind. This means that the total surface area of the blade's assembly facing the wind changes. When the wind is weak, the surface area gets bigger. When the wind is strong, each blade turns on its base and the total surface area gets smaller to reduce the wind pressure in order for the blade assembly to rotate with a constant speed.
  A brake designed to stop the spinning main shaft in case of high winds. Usually a disc brake, similar to the one in automobiles.
  A gearbox that converts the shaft's high-torque low-speed motion into low-torque high-speed motion that fits the electric generator's requirement. The shaft rotates on average at about 12 to 22 rpm while the generator requires approximately 1,800 rpm.
  A generator, whose function is to convert the shaft torque into electricity.
  A nacelle consisting of a cabin that houses all of the above mentioned elements. In modern turbines the nacelle is often of the size of a school bus or bigger. The nacelle sits atop a tower, such as a tubular steel or concrete tower or a lattice tower. Presently there is a trend is to use taller towers because the wind energy typically exponentially increases with the height.
  A yaw assembly whose function is to support the entire machine assembly inside the nacelle on top of the tower and to permit its rotation for alignment with the wind.

This clearly illustrates that converting wind energy directly into electricity utilizing wind turbines involves elaborate equipment and requires high initial costs.

Prior Technology:

In an effort to make offshore wind power facilities even more reliable, Siemens Energy is now testing a new type of wind turbine that works without a gearbox. The main benefit of the new unit lies in its more simplified design, which requires fewer machine components, and will therefore result in lower maintenance costs and a higher level of reliability. This is especially important for offshore facilities, where turbine breakdowns are always very expensive.

The first of the wind turbines without gearboxes has been erected in 2008 in western Denmark. This turbine has an output of 3.6 megawatts (MW). With a rotor diameter of 107 meters.

The project is in a research phase for two years and will enable Siemens Energy to determine whether or not the units without gearboxes will be able to compete with conventional models and, if so, in which performance classes. Wind turbines without gearboxes are generally heavier than conventional units and also more expensive to produce.

The units without gearboxes are instead equipped with synchronous generators that are stimulated by permanent magnets. They directly convert the rotor's movements into electrical energy. The two generators in Denmark boost a torque of roughly 2,500 kilonewton-meters each. By comparison, a powerful electric drive system for a car has torque of significantly less than one kilonewton-meter.

Deficiency of Prior Technology:

The advantages of wind energy are that it is renewable, nonpolluting, and free.

The disadvantages of wind energy are that it is diluted, unpredictable, and requires high initial costs. When wind is not blowing, the wind producing equipment sits idly by and there is no electricity. Wind energy is only available when the wind is blowing within a particular range of wind speeds, i.e., the turbine cannot operate at wind speeds (also called velocities) below the minimum speed and cannot safely operate above the maximum speed. Typically, the minimum speed is 7-8 km/h and the maximum speed is 60 km/h. Hence, the wind energy is only available intermittently. Further, wind power is dependent on the location because it is only seasonal in many areas of the world.

The major disadvantages of the currently used wind turbines are:

- Each has its own electric generating equipment, a gearbox linked to an AC generator atop a tower. Electric equipment is very heavy and expensive and therefore initial cost is very high. Gearboxes for contemporary wind turbines are very big, heavy and expensive machineries. There are two more problems with them. Presently the market demand for them is too high and their availability is insufficient. The manufacturing capacity lags behind the demand about 2 years. And because said gearboxes and generators are big and heavy, it is difficult to lift them to the top of today's tall wind turbine towers. Also, because of their weight and size, the construction of the towers must be very robust. Another object of this invention is to eliminate them altogether in some specific embodiments.
- Each has its own pitch-control assembly. Some smaller turbines are without said assembly. They have a so-called fixed pitch wind turbine rotor. A fixed pitch wind turbine rotor is a simplification at a lower cost over that of a controllable blade pitch wind turbine rotor. However, a fixed pitch rotor is harder to start because the blade pitch for efficient operation is different from that for good starting. A proposed solution to bring the wind turbine rotor up to operating speed is to use its own generator as a motor during startup. A fixed pitch turbine rotor is designed to stall in high winds in order to limit rotor torque and not to damage the generator and blades.
- The machines are too big, tall and bulky. For example, on a large 5 MW turbine the blades alone could be over 18 tons even with the use of carbon fiber reinforcement. The blades diameter now reaches over 120 meters. The generator alone could be over 55 tons.
- The tall towers and blades up to 65 meters long are difficult to transport. Transportation can now cost 20% of equipment costs.
- In horizontal-axis wind turbines (HAWT), the electric generating equipment is installed atop the tower. The present day towers are very tall which makes installation difficult and sometime impossible in remote and high elevation locations because there are not adequate roads for big cranes to get there to deliver and install the heavy equipment. However, high elevations are the best for harvesting wind energy because of continuous high winds there. Besides the problems with installation, the operation and maintenance on the top of large towers is difficult. The blades are also subject to high vibrations during wind gusts and often bend or break apart. All of this shortens the equipment's life span.
- The majority of HAWTs use an upwind design, with the rotor facing the wind in front of the tower. Downwind variants suffer from fatigue and structural failure caused by turbulence when a blade passes through the tower's wind shadow.
- The electricity produced by the windmills must be consumed immediately. Usually wind blows harder at night, The demand for electricity at night is lowest. This creates an operational problem for the utility to whose grid the windmills are connected.
- When wind is not blowing, the entire system is not working and no electricity is produced.
- When the blades of the larges turbines are too long they bend and break in strong and gusty winds.

SUMMARY AND OBJECTS OF THE INVENTION

It is an object of the present invention to reduce the cost of converting wind energy into electricity by providing a better construction and reinforcing and/or replacing the rotor and the blades with a new and more efficient one.

Another object of the present invention is to utilize all wind potential, weak and strong in more remote and high location areas.

Another object of the present invention is to harness the wind energy in an economical way and to improve productivity and cost effectiveness of the wind turbines.

Another object of the present invention is to enable an easy and fast transportation and installation of WT rotor and blades assembly, especially in remote locations, because of the smaller components.

Another object of the present invention is to provide an option for a HAWT with a downwind orientation of the blade's assembly to engage reinforcements for protecting these blades from bending and braking.

Another object of the invention is to build wind turbines with fewer and smaller components, which could be easily installed on remote locations without a need for big cranes.

Yet another object of the invention, in general, is to manage the wind energy to better suit the needs for electricity consumption.

Further objects of the invention will appear as the description proceeds.

To the accomplishment of the above and related objects, this invention may be embodied in the form illustrated in the accompanying drawings, attention being called to the fact, that the drawings are schematic only and that changes may be made in the specific construction illustrated and described within the scope of the appended claims.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

FIG. 1C shows a side view of the blades assembly with double-sided support rods.

FIG. 1D shows an extended rotor assembly 4 of FIG. 1B or 1C with additional support elements 31a, 31b & 31c on the outer side, made of rigid hard or flexible material or of steel cables of equal size, angularly and fixedly attached on its one end to each one blade or to the rods of FIG. 1B or 1C and on its other end to the rotor shaft of said wind turbine.

FIG. 1E shows an extended rotor assembly 4 of FIG. 1B or 1C with additional support elements 31a, 31b & 31c on the inner side, made of rigid hard or flexible material or of steel cables of equal size, angularly and fixedly attached on its one end to each one blade or to the rods of FIG. 1B or 1C and on its other end to the rotor shaft of said wind turbine.

FIG. 1G shows blades reinforcement support where instead of strait rods, the support consists of one or more continues circular piece 32 in the form of a ring or a wheel made of rigid hard or flexible material or of steel cables, fixedly or movably attached concentrically to each blade.

FIG. 2A shows a circular blades reinforcement support for a horizontal WT rotor with smaller blades but a large SWEPT area.

FIG. 3A shows a circular blades reinforcement support for a pitch-controlled rotor assembly where the extended bases are rotatably inserted and go through cylindrical sleeves or cuffs attached to the support frame.

FIG. 3B shows a triangular blades reinforcement support for a pitch-controlled rotor assembly where the extended bases are rotatably inserted and go through cylindrical sleeves or cuffs attached to the support frame.

FIG. 4A shows only a circular blades reinforcement support frame for a pitch-controlled rotor assembly without the extended bases at the foot of the blades, cylindrical sleeves or cuffs and additional support elements, fixedly attached to the support frame on one side and to the hub 4 on the other side.

FIG. 5A shows a circular blades reinforcement support frame for a pitch-controlled rotor assembly with the extended bases at the foot of the blades, rotatably inserted and going through cylindrical sleeves or cuffs and additional support elements fixedly attached to the support frame on one side and to the hub 4 on the other side.

FIG. 5B shows a triangular blades reinforcement support frame for a pitch-controlled rotor assembly with the extended bases at the foot of the blades, rotatably inserted and going through cylindrical sleeves or cuffs and additional support elements, fixedly attached to the support frame.

FIG. 6 shows a circular blades reinforcement double frame support rotor assembly with more then three blades.

FIG. 7 shows a side view of a double sided triangular blades reinforcement support for a pitch-controlled rotor assembly.

DETAILED DESCRIPTION OF THE PREFERRED EMBODIMENTS

Figure 1A:
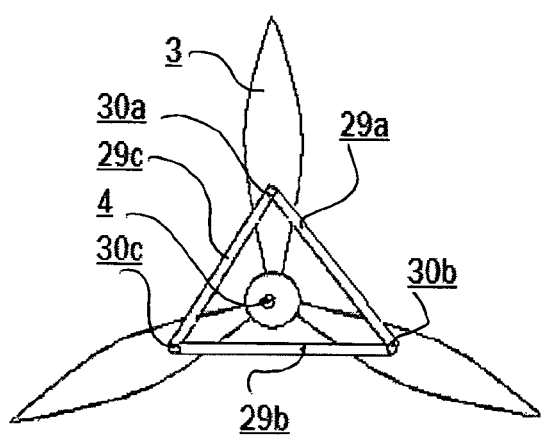
FIG. 1A shows a rotor assembly 4 of a horizontal-axis wind turbine with blades reinforcement support rods 29a, 29b and 29c.

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

The present invention is directed to wind turbine towers or tower systems configured for producing electricity by using large diameter WT rotor. Briefly, the towers of modern, utility-scale wind turbine tower systems are typically metal or cement structures with a circular cross section.

One advantage of the present system is that the need for a pitch-control assembly might be eliminated, however, the present invention is also compatible and adaptable to a pitch-control assembly. The pitch-control assembly is again an expensive and a heavy addition to the wind turbine rotor. The present invention preferably but not exclusively uses a fixed pitch wind turbine rotor. A fixed pitch wind turbine rotor offers a simplification at lower cost over that of a controllable blade pitch wind turbine rotor. A fixed pitch turbine rotor is designed to stall in high winds, to limit rotor's torque. Therefore, the generator must be capable of absorbing the maximum power output the rotor can generate. The rotor in turn must have the capability to not critically overspeed in the event the load is removed from it. The present invention does that by reinforcing the rotor assembly and the blades.

An even more important advantage of the present invention is that it produces more power because any wind, weak or strong, may be harnessed. Wind blows at variable speed, sometimes gusting, while the electric generators powered by the wind turbine must rotate at a constant speed because the AC current generated must have a constant frequency. This requires that the blades of the wind turbine be automatically adjusted in order to rotate at a constant speed. This is done by the pitch-control assembly. But the pitch-control doesn't do all the job expected from it. With a conventional wind turbine, when the wind is weak, the turbine doesn't work because there is a minimum starting wind velocity needed. When the wind is too strong, at the maximum wind velocity, the turbine has to be stopped because it will bend or break the blades or it will turn the generator at higher rotations, which will disable it from delivering the required 50 to 60 Hz of AC power for the grid utility system.

The preference for using a fixed pitch wind turbine rotor in the present invention is not only because it is cheaper but mainly because it can harness more wind energy. This type of rotor is turning faster during high winds as opposed to a rotor with pitch-controlled blades, which keeps on turning with the same speed in all conditions. This means that the pitch-controlled blades are missing much of the energy that could be harnessed during high winds. The energy of the wind doubles when the speed doubles. The fixed pitch rotor captures that energy which can double many times between low and high speeds.

The pitch-control rotor misses on all of that action. It may keep on turning during high wind and it creates an illusion that it is working harder but it is actually capturing the same amount of energy because it is rotating with the same speed as if the wind speed was low. Most of the wing energy, which we don't see just by looking at it, is lost between the blades. Nevertheless, the present invention uses both type of blades, the fixed and the pitch-controlled assemblies.

FIG. 1A shows a rotor assembly of a horizontal-axis wind turbine with blades reinforcement support attachments 29a, 29b and 29c. The blades reinforcement support elements consist of rods of equal size made of rigid hard or flexible material such as plastic, wood or metal, cables or ropes. They could be flat, round or square tubes with holes 30a, 30b and 30c at each end for bolting them to the blades and/or fixedly or movably attached to the blades with fasteners. These fasteners should be exactly in the axial middle of the blades. The blade's assembly should be evenly balanced. If necessary, support rods may be attached to both sides of the blades and fastened with the same bolts or fasteners. Blades reinforcements are necessary in case of strong and gusty winds to support the blades and protect them from bending, breaking or falling apart. The blades of the present invention will occasionally turn with speeds higher then normal and if they are not reinforced and properly balanced the whole assembly may begin wobbling and then break apart from the tower.

Figure 1B:
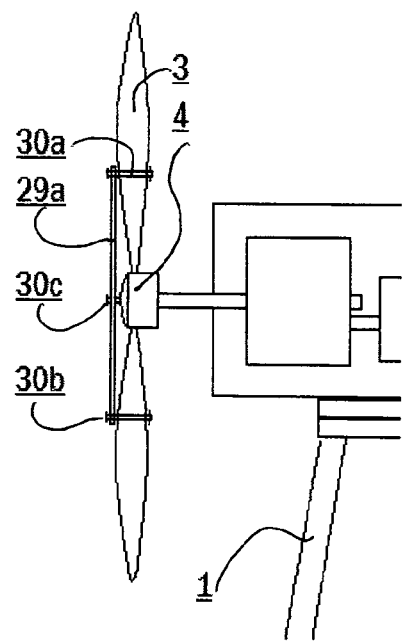
FIG. 1B shows a side view of the blades assembly with the support rods of FIG. 1A.

FIG. 1B shows a side view of the blades assembly with the supporting elements of FIG. 1A.

FIG. 1C shows a front and a side view of the blades assembly with double-sided support elements.

FIG. 1D shows a front and a side view of an extended rotor assembly of FIG. 1B or 1C with additional support elements 31$a$, 31$b$ & 31$c$ on the outer side, made of rigid, hard or flexible material or of steel cables of equal size, angularly and fixedly attached on its one end to each one blade or to the rods of FIG. 1B or 1C and on its other end to the rotor shaft of said wind turbine. During strong winds the fixed blades of the present wind turbine may come under such pressure to cause them to bend or break. These angular attachment elements are supposed to hold the blades giving them additional strength and support.

FIG. 1E shows a front and a side view of an extended rotor assembly 4 of FIG. 1B or 1C with additional support elements 31$a$, 31$b$ & 31$c$ on the inner side, made of rigid, hard or flexible material or of steel cables of equal size, angularly and fixedly attached on its one end to each one blade or to the rods of FIG. 1B or 1C and on its other end to the rotor shaft of said wind turbine.

Figure 1F:
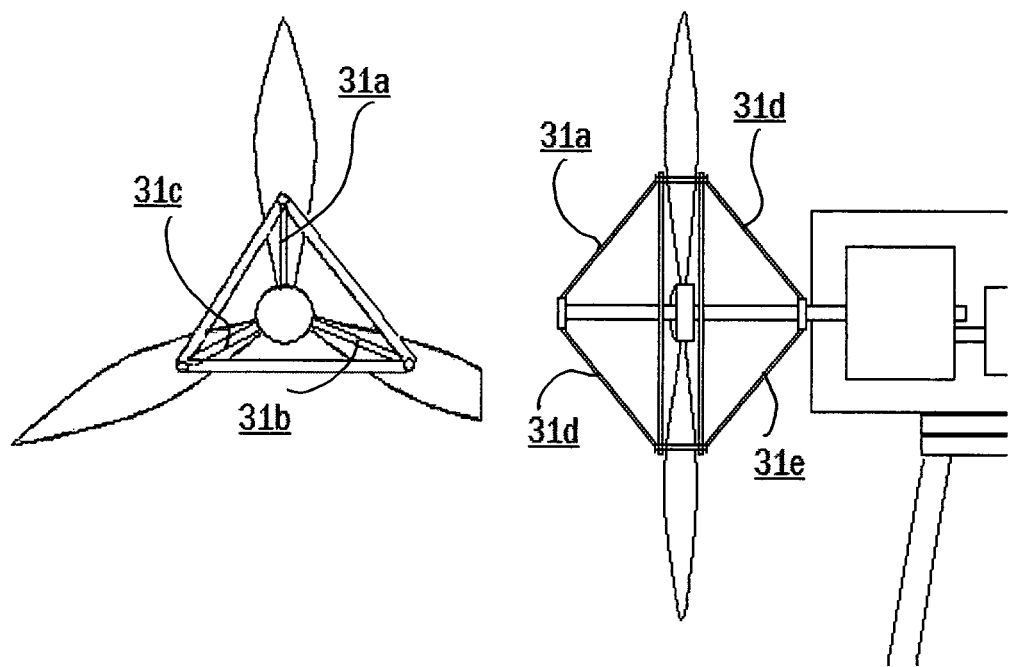
FIG. 1F shows an extended rotor assembly 4 of FIG. 1B or 1C with additional support elements on both sides 31a, 31b & 31c and 31d, 31e & 31f (not showing), made of rigid hard or flexible material or of steel cables of equal size, angularly and fixedly attached on its one end to each one blade or to the rods of FIG. 1B or 1C and on its other end to the rotor shaft of said wind turbine.

FIG. 1F shows a front and a side view of an extended rotor assembly 4 of FIG. 1B or 1C with additional support elements 31$a$, 31$b$ & 31$c$ on the outer side and 31$d$, 31$e$ & 31$f$ (not showing) on the inner side, made of rigid, hard or flexible material or of steel cables of equal size, angularly and fixedly attached on its one end to each one blade or to the rods of FIG. 1B or 1C and on its other end to the rotor shaft of said wind turbine.

FIG. 1G shows blades reinforcement support wherein instead of rods, the support consists of one or more concentric circular pieces 32 in the form of a ring or a wheel, made of rigid, hard or flexible material fixedly or movably attached to each blade. These wheel-like elements or rings might be installed on both sides of the blades.

FIG. 2A shows a circular blades reinforcement support for a horizontal WT rotor with smaller blades but a large SWEPT area.

SWEPT AREA is the area through which the rotor blades of a wind turbine spin, as seen when directly facing the center of the rotor blades. The larger the diameter of the swept area or the size of its blades, the more power the turbine is capable of extracting from the wind. The larger the blades, the stronger they need to be to withstand the higher levels of centrifugal and cyclic varying gravitational loads. With a 31 m (100 ft) blade weighting around 4.5 tons and a 54 m (177 ft) weighting around 13 tons the weight of the blade is not proportional to the size and power rating of the machine. Each extra meter of length requires extra strength and adds further to the structures weight and so compounds the problem. Also it increases the production and transportation cost. Furthermore, the bending moment across the swept area of the blade can vary considerably with a possible difference of several meters a second in wind speed between the top and the bottom of the blades rotation. This all adds up to a substantial increase in fatigue, not only in the structure but the machines hub, bearing, drive shaft and support tower.

The blades of FIG. 2A start from the support ring itself 32, not strait from the rotor hub. The blades are attached to the rotor hub via extended base or feet 33$a$, 33$b$, 33$c$ at the roots ends. These extended feet are usually in the form of a cylinder or a or a pipe which, in a case of a rotor with a pitch control they are rotatably inserted and go through the blade support frame via hollow cylindrical sleeves, cuffs or collars in a form of ring or a short tube, with or without bearing firmly attached to the supporting frame. In this case the area inside the supporting and reinforcing elements or rings, forming a frame is not usable for energy producing, there are no blades inside that area. But the overall working SWEPT area of the blades is enlarged and the benefit from this configuration is that with the same size of the blades the swept area increases more then THREE TIMES and at the same time the blades are just as strong as if they were directly attached to the hub.

For example, if the blades are 50 meters each long, the diameter of the swept area is 100 m and the surface of the swept area is approximately 7,850 sq.m. But if the blades are 100 m each long, then the diameter of the swept area is 200 m and the surface is 31,400 sq.m. If we remove the smaller inner swept area of 7,850 sq.m. (the area inside the support structure) from the outer big 31,400 sq.m. swept area we will end up with a surface of 23,550 sq.m. swept area. This is three times bigger swept area using the same small 50 m blades attached to a 50 m radius support structure. To reach the same size of that 23,550 sq.m. swept area with blades directly attached to the rotor hub, we need 86.60 m long blades with a total diameter of 173.20 m.

Figure 2B:
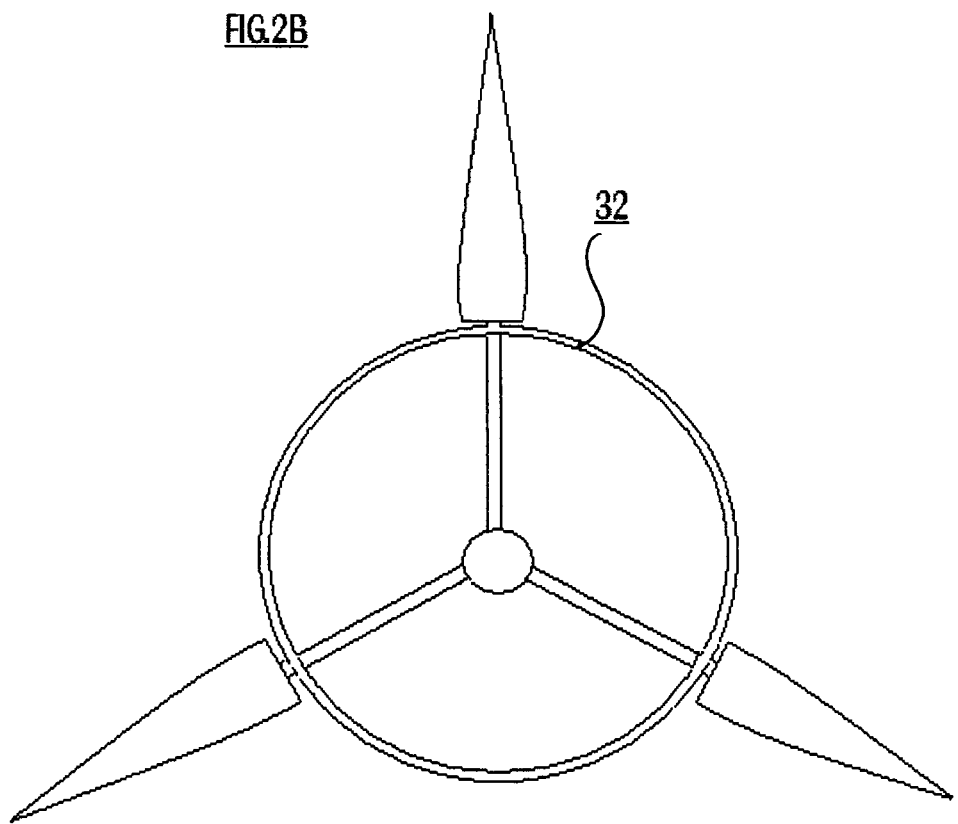
FIG. 2B shows a circular blades reinforcement support where the blades have bigger surface and are in a form of half or a top part of a regular blade.

FIG. 2B shows a circular blades reinforcement support where the blades have bigger surface and are in a form of half or a top part of a regular blade.

FIG. 3A shows a circular blades reinforcement support for a pitch-controlled rotor assembly where the extended bases 33$a,b$ & $c$ are rotatably inserted and go through cylindrical sleeves or cuffs 34$a$, 34$b$ & 34$c$ attached to the support frame 32.

FIG. 3B shows a triangular blades reinforcement support for a pitch-controlled rotor assembly where the extended bases 33$a,b$ & $c$ are rotatably inserted and go through cylindrical sleeves or cuffs 34$a$, 34$b$ & 34$c$ attached to the support frame 29.

FIG. 4A shows only a circular blades reinforcement support frame 32 for a pitch-controlled rotor assembly without the extended bases at the foot of the blades 33$a,b$ & $c$, cylindrical sleeves or cuffs 34$a$, 34$b$ & 34$c$ and additional support elements 35$a$, 35$b$ & 35$c$ fixedly attached to the support frame 32 on one side and to the hub 4 on the other side.

Figure 4B:
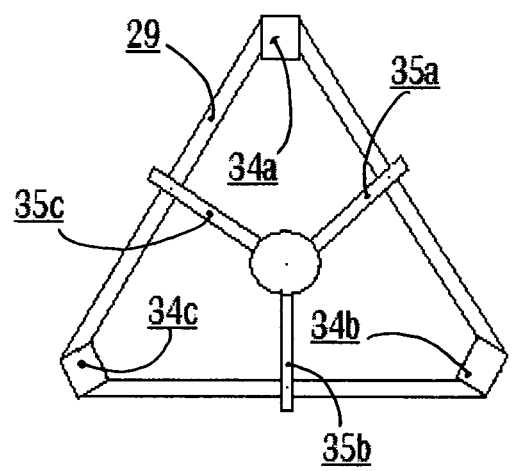
FIG. 4B shows only a triangular blades reinforcement support frame for a pitch-controlled rotor assembly without the extended bases at the foot the blades, cylindrical sleeves or cuffs and additional support elements fixedly attached to the support frame on one side and to the hub 4 on the other side.

FIG. 4B shows only a triangular blades reinforcement support frame 29 for a pitch-controlled rotor assembly without the extended bases at the foot the blades 33$a,b$ & $c$, cylindrical sleeves or cuffs 34$a$, 34$b$ & 34$c$ and additional support elements 35$a$, 35$b$ & 35$c$ fixedly attached to the support frame 29 on one side and to the hub 4 on the other side.

FIG. 5A shows a circular blades reinforcement support frame 32 for a pitch-controlled rotor assembly with the extended bases at the foot of the blades 33$a,b$ & $c$, rotatably inserted and going through cylindrical sleeves or cuffs 34$a$, 34$b$ & 34$c$ and additional support elements 35$a$, 35$b$ & 35$c$ fixedly attached to the support frame 32 on one side and to the hub 4 on the other side.

FIG. 5B shows a triangular blades reinforcement support frame 29 for a pitch-controlled rotor assembly with the extended bases at the foot of the blades 33$a,b$ & $c$, rotatably inserted and going through cylindrical sleeves or cuffs 34$a$, 34$b$ & 34$c$ and additional support elements 35$a$, 35$b$ & 35$c$ fixedly attached to the support frame 29 on one side and to the hub 4 on the other side. The extended bases at the foot of the blades 33$a,b$ & $c$ are here a part of additional blades 36$a$, 36$b$ and 36$c$ inside the smaller, inner Swept Area of the blade assembly in order to increase the overall Swept Area.

FIG. 6 shows a circular blades reinforcement double frame support rotor assembly with more then three blades.

FIG. 7 shows a side view of a double sided triangular blades reinforcement support for a pitch-controlled rotor assembly where the extended bases 33a,b & c are rotatably inserted and go through cylindrical sleeves or cuffs 34a, 34b & 34c attached to the support frame 29.

What is claimed is:

1. A blade assembly for a horizontal-axis wind turbine rotor comprising:
    a central rotor hub having a central axis and a rotor hub shaft; said rotor hub shaft having a portion extended in a front of said central rotor hub and another portion extended in a rear of said central rotor hub;
    a plurality of blades mounted on said central rotor to rotate through a plane of rotation, each of said blades lying along a blade axis and having a proximal end radially extended from said central rotor and a distal end outwardly extending to define a blade surface between said proximal end and said distal end, wherein said blade surfaces are arranged in such a manner that when an air flow exerts on said blade surfaces, said central rotor is driven to rotate for generating a rotational power to a power generator;
    a plurality of rods or cables of equal size, made of a rigid hard or flexible material; each end of a first group of said plurality of rods or cables of equal size connecting with each other to form a plurality of frames; each corner of a first frame of said plurality of frames fixedly or movably attached to said blade surface of one of said plurality of blades; each one end of a second group of said plurality of rods or cables of equal size fixedly or movably attached to each said corner of said first frame and each other end of said second group of said plurality of rods or cables of equal size fixedly or movably attached to said front extended portion of said rotor hub shaft.

2. The blade assembly for a horizontal-axis wind turbine rotor according to claim 1, wherein each corner of a second frame of said plurality of said frames fixedly or movably attached to an opposite surface of said blade surface of one of said plurality of blades.

3. The blade assembly for a horizontal-axis wind turbine rotor according to claim 2, wherein each one end of a third group of said plurality of rods or cables of equal size fixedly or movably attached to each said corner of said second frame and each other end of said third group of said plurality of rods or cables of equal size fixedly or movably attached to said rear extended portion of said rotor hub shaft.

4. The blade assembly for a horizontal-axis wind turbine rotor according to claim 1, wherein said each end of said first group of said plurality of rods or cables of equal size connecting with each other by cylindrical collars or sleeves to form said plurality of frames.

* * * * *